March 29, 1949.     C. A. THOMAS     2,465,824
DYNAMOELECTRIC MACHINE
Filed Feb. 17, 1948
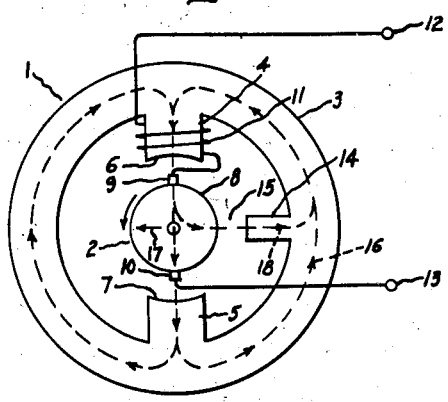
Fig. 1.
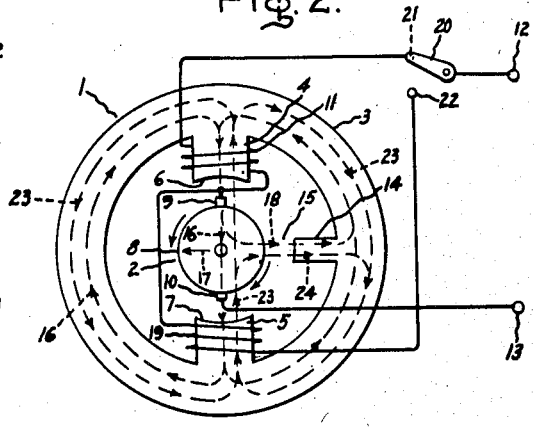
Fig. 2.
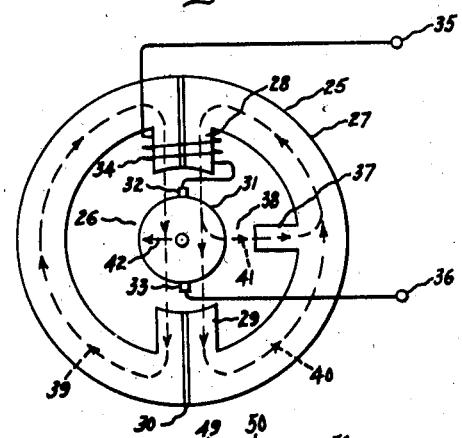
Fig. 3.
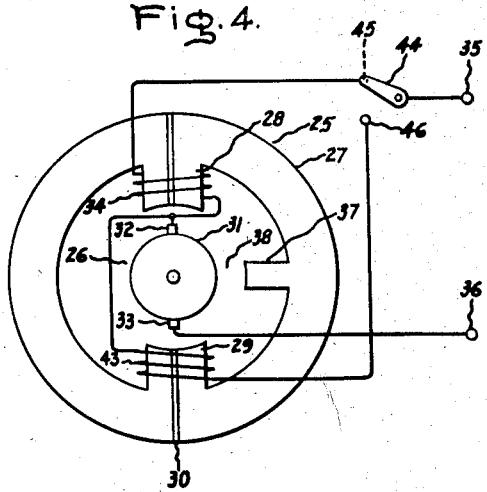
Fig. 4.
Fig. 5.
Inventor:
Charles A. Thomas,
by *Prowell S. Mack*
His Attorney.

Patented Mar. 29, 1949

2,465,824

UNITED STATES PATENT OFFICE 2,465,824

DYNAMOELECTRIC MACHINE

Charles A. Thomas, Fort Wayne, Ind., assignor to General Electric Company, a corporation of New York Application February 17, 1948, Serial No. 8,783

16 Claims. (Cl. 322—6)

1

This invention relates to dynamoelectric machines and more particularly to such machines of the commutator type having stator members provided with salient main poles and interpoles.

In the design of commutator-type dynamoelectric machines, particularly in the fractional horsepower frame sizes, it is necessary for maximum efficiency to effect substantial neutralization of the armature reaction at the point of commutation while providing a machine of minimum physical size. Conventional interpoles may be utilized for neutralization of the armature reaction, however, the interpole windings may necessitate an undesirable increase in the overall size of the machine. Furthermore, in the design of commutator-type universal motors, the neutralization of armature reaction becomes of particular importance and it is also frequently desirable to provide such a motor with reversible characteristics.

An object of this invention is to provide an improved commutator-type dynamoelectric machine.

Another object of this invention is to provide an improved commutator-type dynamoelectric machine of minimum size wherein the armature reaction is overcome to secure proper commutation.

A further object of this invention is to provide an improved universal motor of the commutator type in which the armature reaction is overcome to secure proper commutation.

A still further object of this invention is to provide an improved reversible commutator-type universal motor of minimum size in which the armature reaction is overcome to secure proper commutation.

An additional object of this invention is to provide an improved stationary member for a commutator-type dynamoelectric machine.

Further objects and advantages of this invention will become apparent and the invention will be better understood by reference to the following description and accompanying drawing. The features of novelty which characterize this invention will be pointed out with particularity in the claims annexed to and forming a part of this specification.

A feature of this invention is the provision of a stator member for a dynamoelectric machine having, for instance in a two pole machine, only one field coil on one salient pole, which provides flux for a consequent main pole and a consequent interpole. This feature eliminates one field coil and the interpole coil thereby eliminating the

2 necessity of providing winding space and pole tips on the unwound poles. With this construction, the advantages of the use of interpoles may be extended to machines of minimum size where conventional interpole windings could not be used. Furthermore, a reversible motor of minimum size may be provided by utilizing a field winding on each main pole, one for each direction of rotation, since the consequent interpole, as will be hereinafter pointed out, will function properly in either direction of rotation. In addition, the advantages of interpole armature reaction compensation can be extended to universal commutator type motors where the resistance and reactance of interpole windings would normally be detrimental to the output of the machine.

In the drawing, Fig. 1 illustrates schematically a two pole dynamoelectric machine of the commutator type provided with the improved consequent interpole construction of this invention, Fig. 2 illustrates a split series two-pole dynamoelectric machine constructed in accordance with this invention, Fig. 3 shows the consequent interpole feature applied to a two-pole dynamoelectric machine provided with a magnetically split stator construction, Fig. 4 shows a dynamoelectric machine similar to Fig. 3 provided with a split series field arrangement, and Fig. 5 shows a stationary member for a commutator-type dynamoelectric machine constructed in accordance with this invention.

Referring now to Fig. 1, there is shown a two-pole dynamoelectric machine provided with relatively rotatable stator and armature members generally designated as 1 and 2 respectively. The stator member is formed of a substantially cylindrical yoke portion 3 which may be conveniently formed of a plurality of relatively thin laminations of magnetic material, or may be alternatively of solid construction depending upon the application desired. The yoke portion 3 is provided with a polar projection or salient pole 4 extending radially inward therefrom, which is adapted to receive a field exciting winding. A second polar projection 5 is provided diametrically opposite from the pole 4 extending radially inward from the yoke portion 3. The pole faces 6 and 7 respectively of poles 4 and 5 define a central bore in which is rotatably supported the armature member 2. The armature, which may be of conventional construction, is provided with a commutator 8 which is contacted by contact brushes 9 and 10. A field exciting coil 11 is positioned on the pole 4 and is shown here connected in a series arrangement with the brushes 9 and 10 to an external source of exciting power 12 and 13.

In order to provide the improved armature reaction compensating feature of this invention, and thereby insure proper commutation, the arrangement now to be described is provided. A third polar projection 14 extends radially inward from the yoke 3 and is positioned between the poles 4 and 5. The field exciting coil 11 is provided with sufficient turns to furnish the necessary operating excitation flux and also to furnish sufficient additional commutation flux to the interpole 14, the proper amount of commutation flux being regulated by the air gap 15 of the interpole.

Assuming that the machine of Fig. 1 is arranged as a motor and that the armature is turning in the counter-clockwise direction as indicated, the operating flux furnished by the coil 11 will issue from the pole 4, traverse the armature and pole 5, and return to pole 4 through the yoke 3, as indicated by the arrows 16. The armature reaction flux caused by the current flowing in the armature conductors will then have a direction indicated by the arrow 17. The provision of the interpole 14 will cause a portion of the flux produced by the field coil 11 to be diverted and to cross the airgap 15 and enter the interpole returning to the pole 4 through yoke 3. This diverted flux, indicated by the arrow 18, is in a direction opposite to the armature reaction flux 17 and can be made to substantially neutralize the armature reaction flux at the point of commutation by proper proportioning of the field coil 11, armature windings, and interpole airgap 15.

While the dynamoelectric machine shown in Fig. 1 is illustrated as arranged with a series field connection, it will be readily apparent that the provision of the consequent interpole is not limited to a series arrangement, but is also equally applicable to a shunt or compound arrangement of the field winding.

It can now be readily understood that the construction described above can be used to advantage where it is desired to provide a reversible split series motor with good commutation. Referring now to Fig. 2 wherein like parts are designated by like members, such an arrangement applied to a two-pole motor is shown. Here, the stator 1 is provided with a substantially cylindrical yoke portion 3 from which polar projections 4 and 5 project radially inward. The yoke and polar projections may be conveniently formed of laminated magnetic material, or may be of solid construction. The polar projections may be formed integral with the yoke 3, or may be separate parts secured in any of the methods well known in the art. The pole faces 6 and 7 respectively define the central bore in which is rotatably supported the armature member 2 provided with commutator 8 and contact brushes 9 and 10. The polar projection 4 is again provided with a field exciting winding 11 and in addition, the polar projection 5 is provided with field exciting winding 19. These windings are adapted to be excited from the external source 12 and 13 and switching means 20 is used to selectively energize either winding 11 or 19 depending upon the direction of rotation desired. As can be seen, the windings 11 and 19 are arranged in series respectively with the brushes 9 and 10. Therefore, when the switch 20 is moved to contact 21, winding 11 only is energized and, since the winding 19 is not energized, pole 5 becomes a consequent pole with respect to pole 4. Conversely, when the switch 20 is moved to contact 22 for the other direction of rotation, winding 19 only is energized and pole 4 becomes a consequent pole with respect to pole 5.

As in the embodiment of Fig. 1, interpole 14 extends radially inward from the yoke 3 between the poles 4 and 5 and forms an air gap 15 with the armature 2. Assuming a counterclockwise direction of rotation of the armature with the field winding 11 energized, the operating flux will follow the path indicated by the arrows 16 and the flux diverted to the interpole 14, indicated by the arrows 18, can be made to substantially neutralize the armature reaction flux, indicated by the arrow 17, to secure proper commutation. Now assuming a clockwise direction of rotation, with the field winding 19 energized the operating flux will follow the path indicated by the arrows 23, the direction being reversed from the direction of the operating flux when winding 11 is energized. However, since the current flowing in the armature windings is in the same direction regardless of which field winding is energized, the armature reaction flux 17 will still be in the same direction. It can now be readily seen that with the field winding 19 energized a portion of the flux will again be diverted to the interpole as indicated by the arrows 24. It will be noted that this interpole flux for clockwise rotation is in the same direction as the interpole flux 18 for counterclockwise rotation and, therefore, can still be made to effectively neutralize the armature reaction 17 at the point of commutation. It will be readily understood from the above description that this construction provides a split series reversible motor with the advantages of interpole commutation without, however, the necessity for providing interpole windings.

Referring now to Fig. 3, there is shown a commutator type dynamoelectric machine similar to Fig. 1, however, with the magnetic circuit split along the axis of the two main poles. Here, there are provided relatively rotatable stator and rotor members generally identified as 25 and 26 respectively. The stator member comprises a substantially cylindrical yoke portion 27 and two radially inwardly extending polar projections 28 and 29. The magnetic circuit is split, as at 30, along a diameter of the yoke 27 extending substantially through the center of the poles 28 and 29. Nonmagnetic material may be interposed between the two segments of the yoke and the segments may be suitably secured together mechanically by any convenient non-magnetic means. The armature is provided with a commutator 31 and contact brushes 32 and 33. A field winding 34 is positioned on the pole 28 and connected in series with the armature through brushes 32 and 33 to a source of external power 35 and 36. An interpole 37 projects radially inward from the yoke between the poles 28 and 29 forming with the armature an air gap 38.

As in the embodiment of Fig. 1, the operating flux furnished by the winding 34 follows a path indicated by the arrows 39 and 40 through the two segments of the magnetic circuit. A portion of the operating flux is diverted to the interpole 37, as indicated by the arrows 41, and is in the proper direction to permit substantial neutralization of the armature reaction 42 at the point of commutation.

The split magnetic circuit of Fig. 3 is provided in order to effect further neutralization of the armature reaction flux. As can be readily seen, the splitting of the magnetic path along the axis of the poles 28 and 29 does not materially affect the reluctance of the magnetic path followed by the operating flux, however, the reluctance of the path of the armature reaction flux through tips of the poles 28 and 29 is considerably increased thereby substantially reducing the effect of the armature reaction. With this construction a smaller number of turns can be used in the winding 34 since less interpole flux 41 is needed. This split magnetic circuit feature is particularly applicable to universal motors since the heating and resultant power loss due to hysteresis losses in the pole tips caused by the alternations of the armature reaction flux is substantially reduced. In addition, the motor can be operated with heavier flux since the flux density by virtue of the split construction is nearly uniform across the pole face.

As in the case of the embodiment of Fig. 1, the split magnetic construction with the consequent interpole is readily adaptable for use as a split series motor. Referring now to Fig. 4, there is shown a split series two-pole motor substantially similar to the embodiment of Fig. 2, however, provided with the split magnetic feature of Fig. 3. Here, like parts being indicated by like numbers, the stator member 25 comprises a yoke portion 27 and two radially inwardly extending polar projections 28 and 29. The armature 26 has a commutator 31 which is contacted by brushes 32 and 33. A field winding 34 is positioned on pole 28 and another field winding 43 positioned on pole 29. The magnetic circuit is split, as at 30, along a diameter of the yoke extending substantially through the center of the poles 28 and 29. A consequent interpole 37 extends radially inward from the yoke between the poles 28 and 29 and defines with the armature an airgap 38. The field windings 34 and 43 are respectively arranged in series with the armature through brushes 32 and 33 and are excited from external source 35 and 36. A switch 44 is used to select either winding 34 or 43 for the desired direction of rotation. Thus, when the switch 44 is at contact 45, winding 34 is excited and, since winding 43 is not excited, pole 29 forms a consequent pole with respect to pole 28. Conversely, when the switch is at contact 46, winding 43 is energized and pole 28 forms a consequent pole with respect to pole 29. As explained above under the discussion of Fig. 2, whichever field winding is selectively energized by the switch 44, a portion of the operating flux will be diverted to the consequent interpole 37 and, regardless of the direction of rotation, will be in the correct direction to neutralize the armature reaction flux at the point of commutation. This construction permits the design of a reversible split series universal motor with the combined advantages of split magnetic construction and interpole armature reaction compensation, thus greatly reducing the physical size of a motor over a motor of the same rating using conventional construction.

Referring now to Fig. 5, there is shown a particular form of a stationary member or stator applicable to the embodiment of Fig. 3. Here, there is provided a substantially cylindrical yoke portion composed of segments 47 and 48. Projecting radially inward from the yoke segments are polar projection segments 49 and 50 which are provided with pole tips 51 and 52. These pole tips define with the yoke segments 47 and 48 winding slots 53 and 54 respectively, adapted to receive a field exciting winding. At a point diametrically opposite from the polar projections 49 and 50 is located a second set of polar projections 55 and 56 extending radially inward from the yoke segments 47 and 48 respectively. The two stator segments may be separated by non-magnetic spacers 57 and appropriately secured together mechanically by conventional non-magnetic means. A third polar projection 58 extends radially inward from the yoke segment 48 and is provided with a pole shoe 59. As explained under the description of Figs. 1 through 4, this polar projection forms a consequent interpole and through the diversion of a portion of the flux furnished by the exciting winding, can be made to furnish a proper amount of flux for good commutation, the armature reaction at the point of commutation being overcome by flux from the field coil diverted to the interpole.

Since only a single field exciting winding is provided, the polar projections 55 and 56 form a consequent pole with poles 51 and 52 and can be of minimum size, no winding space being necessary. Thus, the pole faces 60 and 61 of the polar projections 51, 52 and 55, 56 respectively, together with the pole face 62 of the interpole 58, define the central bore, the centerline of which can be eccentric with respect to the centerline of the yoke portion 47 and 48. This feature permits construction of a machine with a much smaller distance from the mounting surface to the rotor shaft. The eccentricity of the rotor shaft is particularly applicable to gear motors. In such a motor with an output shaft mounted for instance with the same eccentricity as the rotor shaft, the gear inside the end shield can be made to properly mesh with the gear on the rotor shaft by simply rotating the end shield about the center of the yoke. Furthermore, due to the wide latitude in the distance available between the center of the rotor shaft and the center of the output shaft in such a construction, a wider range of gear ratios can be made available than could be utilized with a machine of conventional construction.

While the embodiments described above are shown with series and split series field arrangements, it can be readily understood that other field circuits can be utilized with the improved construction of this invention.

From the foregoing it can be readily seen that the provision of a consequent interpole provides a commutator-type dynamoelectric machine of minimum physical size yet with maximum efficiency due to the ability to furnish proper flux for commutation without either extra commutating windings or by setting brushes at an angle from neutral.

While I have illustrated and described specific embodiments of this invention, modifications will occur to those skilled in the art and I intend in the appended claims to cover all modifications which do not depart from the spirit and scope of this invention.

What I claim as new and desire to secure by Letters Patent of the United States is:

1. A stationary member for a commutator type motor or generator having a circular yoke portion, a polar projection extending radially inward from said yoke adapted to receive a field coil for said dynamoelectric machine, a second polar projection extending radially inward from said yoke and forming a consequent pole with said first named polar projection, and a single polar projection extending radially inward from said yoke and interposed between said first and second named polar projections forming a consequent interpole with said first named polar projection.

2. A commutator type motor or generator having relatively rotatable armature and stator members; said stator member comprising a circular yoke portion, a polar projection extending radially inward from said yoke adapted to receive a field winding for said dynamoelectric machine, a second polar projection extending radially inward from said yoke and forming a consequent pole with said first named polar projection, and a single polar projection extending radially inward from said yoke and positioned between said first and second named polar projections; and a field coil positioned on said first named polar projection, said single polar projection forming a consequent interpole with said first named polar projection whereby a portion of the flux provided by said field coil is diverted from said armature member into said single polar projection substantially neutralizing the armature reaction in said armature at the point of commutation.

3. A stationary member for a commutator type motor or generator having, a substantially circular yoke portion, a polar projection extending radially inward from said yoke adapted to receive a field winding for said dynamoelectric machine, a second polar projection extending radially inward from said yoke and forming a consequent pole with said first named polar projection, and a single polar projection extending radially inward from said yoke and positioned between said first named and second named polar projections forming a consequent interpole with said first named polar projection, said polar projections defining a central bore adapted to receive an armature member, the center line of said bore being eccentric with respect to the center line of said yoke portion.

4. A commutator type motor or generator having relatively rotatable armature and stator members; said stator member comprising, a circular yoke portion, a polar projection extending radially inward from said yoke and adapted to receive a field coil for said dynamoelectric machine, a second polar projection extending radially inward from said yoke and adapted to receive another field coil for said dynamoelectric machine, and a single polar projection extending radially inward from said yoke and positioned between said first and second named polar projections; a field coil positioned on said first named polar projection and adapted to be excited from an external source, another field winding positioned on said second polar projection and adapted to be excited from said external source, and means for selecting either of said field coils for energization from said external source, the polar projection associated with the field coil not energized forming a consequent pole with the polar projection associated with the energized field coil, said single polar projection forming a consequent interpole with the polar projection associated with the energized field coil whereby a portion of the flux provided by said field coil is diverted from said armature to said single polar projection substantially neutralizing the armature reaction of said armature at the point of commutation.

5. A stationary member for a commutator type motor or generator having, a cylindrical yoke portion, a polar projection extending radially inward from said yoke and adapted to receive a field coil for said dynamoelectric machine, a second polar projection extending radially inward from said yoke and forming a consequent pole with said first named polar projection, and a single polar projection extending radially inward from said yoke forming a consequent interpole with said first named polar projection, said yoke and said first named and said second named polar projections being split magnetically along a diameter of said yoke extending substantially through the centers of said first named and second named polar projections.

6. A stationary member for a commutator type motor or generator having, a cylindrical yoke portion, a polar projection extending radially inward from said yoke and adapted to receive a field coil for said dynamoelectric machine, a second polar projection extending radially inward from said yoke and forming a consequent pole with said first named polar projection, and a single polar projection extending radially inward from said yoke forming a consequent interpole with said first named polar projection, said yoke and said first named and said second named polar projections being split magnetically along a diameter of said yoke extending substantially through the centers of said first named and second named polar projections forming two yoke segments, and means for securing said segments together.

7. A stationary member for a dynamoelectric machine having, a cylindrical yoke portion, a polar projection extending radially inward from said yoke and adapted to receive a field coil for said dynamoelectric machine, a second polar projection extending radially inward from said yoke and forming a consequent pole with said first named polar projection, and another polar projection extending radially inward from said yoke forming a consequent interpole with said first named polar projection, said yoke and said first named and said second named polar projections being split magnetically along a diameter of said yoke extending substantially through the centers of said first named and second named polar projections forming two yoke segments, nonmagnetic material interposed between said segments, and means for securing said segments together.

8. A stationary member for a commutator type motor or generator having, a substantially circular yoke portion, a polar projection extending radially inward from said yoke adapted to receive a field winding for said dynamoelectric machine, a second polar projection extending radially inward from said yoke and forming a consequent pole with said first named polar projection, and a single polar projection extending radially inward from said yoke and positioned between said first named and second named polar projections forming a consequent interpole with said first named polar projection, said polar projections defining a central bore adapted to receive an armature member, the center line of said bore being eccentric with respect to the center line of said yoke portion, said yoke portion and said first named and second named polar projections being split magnetically along a diameter of said yoke extending substantially through the center of said first named and said second named polar projections.

9. A stationary member for a commutator type motor or generator having, a substantially circular yoke portion, a polar projection extending radially inward from said yoke adapted to receive a field winding for said dynamoelectric machine, a second polar projection extending radially inward from said yoke and forming a consequent pole with said first named polar projection, a single polar projection extending radially inward from said yoke and positioned between said first named and second named polar projections forming a consequent interpole with said first named polar projection, said polar projections defining a central bore adapted to receive an armature member, the center line of said bore being eccentric with respect to the center line of said yoke portion, said yoke portion and said first named and second named polar projections being split magnetically along a diameter of said yoke extending substantially through the center of said first named and said second named polar projections forming two yoke segments, and means for nonmagnetically securing said segments together.

10. A stationary member for a dynamoelectric machine having, a substantially circular yoke portion, a polar projection extending radially inward from said yoke adapted to receive a field winding for said dynamoelectric machine, a second polar projection extending radially inward from said yoke and forming a consequent pole with said first named polar projection, another polar projection extending radially inward from said yoke and positioned between said first named and second named polar projections forming a consequent interpole with said first named polar projection, said polar projections defining a central bore adapted to receive an armature member, the center line of said bore being eccentric with respect to the center line of said yoke portion, said yoke portion and said first named and second named polar projections being split magnetically along a diameter of said yoke extending substantially through the center of said first named and said second named polar projections forming two yoke segments, nonmagnetic material interposed between said segments, and means for nonmagnetically securing said segments together.

11. A commutator type motor or generator having relatively rotatable armature and stator members; said stator member comprising, a circular yoke portion, a polar projection extending radially inward from said yoke and adapted to receive a field coil for said dynamoelectric machine, a second polar projection extending radially inward from said yoke and adapted to receive another field coil for said dynamoelectric machine, and a single polar projection extending radially inward from said yoke and positioned between said first and second named polar projections; a field coil positioned on said first named polar projection and adapted to be excited from an external source, another field winding positioned on said second polar projection and adapted to be excited from said external source, and means for selecting either of said field coils for energization from said external source, the polar projection associated with the field coil not energized forming a consequent pole with the polar projection associated with the energized field coil, said single polar projection forming a consequent interpole with the polar projection associated with the energized field coil whereby a portion of the flux provided by said field coil is diverted from said armature to said single polar projection substantially neutralizing the armature reaction of said armature at the point of commutation, said yoke portion and said first named and said second named polar projections being split magnetically along a diameter of said yoke extending substantially through the center of said first named and said second named polar projections.

12. A commutator type motor or generator having relatively rotatable armature and stator members; said stator member comprising, a circular yoke portion, a polar projection extending radially inward from said yoke and adapted to receive a field coil for said dynamoelectric machine, a second polar projection extending radially inward from said yoke and adapted to receive another field coil for said dynamoelectric machine, and a single polar projection extending radially inward from said yoke and positioned between said first and second named polar projections; a field coil positioned on said first named polar projection and adapted to be excited from an external source, another field winding positioned on said second polar projection and adapted to be excited from said external source, means for selecting either of said field coils for energization from said external source, the polar projection associated with the field coil not energized forming a consequent pole with the polar projection associated with the energized field coil, said single polar projection forming a consequent interpole with the polar projection associated with the energized field coil whereby a portion of the flux provided by said field coil is diverted from said armature to said single polar projection substantially neutralizing the armature reaction of said armature at the point of commutation, said yoke portion and said first named and said second named polar projections being split magnetically along a diameter of said yoke extending substantially through the center of said first named and said second named polar projections forming two yoke segments, and means for nonmagnetically securing said segments together.

13. A dynamoelectric machine having relatively rotatable armature and stator members; said stator member comprising, a circular yoke portion, a polar projection extending radially inward from said yoke and adapted to receive a field coil for said dynamoelectric machine, a second polar projection extending radially inward from said yoke and adapted to receive another field coil for said dynamoelectric machine, and a third polar projection extending radially inward from said yoke and positioned between said first and second named polar projections; a field coil positioned on said first named polar projection and adapted to be excited from an external source, another field winding positioned on said second polar projection and adapted to be excited from said external source, means for selecting either of said field coils for energization from said external source, the polar projection associated with the field coil not energized forming a consequent pole with the polar projection associated with the energized field coil, said third named polar projection forming a consequent interpole with the polar projection associated with the energized field coil whereby a portion of the flux provided by said field coil is diverted from said armature to said third named polar projection substantially neutralizing the armature reaction of said armature at the point of commutation, said yoke portion and said first named and said second named polar projections being split magnetically along a diameter of said yoke extending substantially through the center of said first named and said second named polar projections forming two yoke segments, nonmagnetic material interposed between said segments, and means for nonmagnetically securing said segments together.

14. A commutator type motor or generator having relatively rotatable armature and stator members; said stator member comprising a circular yoke portion, a polar projection extending radially inward from said yoke adapted to receive a field winding for said dynamoelectric machine, a second polar projection extending radially inward from said yoke and forming a consequent pole with said first named polar projection, and a single polar projection extending radially inward from said yoke and positioned between said first and second named polar projections; and a field coil positioned on said first named polar projection, said single polar projection forming a consequent interpole with said first named polar projection whereby a portion of the flux provided by said field coil is diverted from said armature member into said single polar projection substantially neutralizing the armature reaction in said armature at the point of commutation, said yoke portion and said first named and said second named polar projections being magnetically split along a diameter of said yoke extending substantially through the center of said first named and said second named polar projections.

15. A commutator type motor or generator having relatively rotatable armature and stator members; said stator member comprising a circular yoke portion, a polar projection extending radially inward from said yoke adapted to receive a field winding for said dynamoelectric machine, a second polar projection extending radially inward from said yoke and forming a consequent pole with said first named polar projection, and a single polar projection extending radially inward from said yoke and positioned between said first and second named polar projections; a field coil positioned on said first named polar projection, said single polar projection forming a consequent interpole with said first named polar projection whereby a portion of the flux provided by said field coil is diverted from said armature member into said last named polar projection substantially neutralizing the armature reaction in said armature at the point of commutation, said yoke portion and said first named and said second named polar projections being magnetically split along a diameter of said yoke extending substantially through the center of said first named and said second named polar projections forming two yoke segments, and means for nonmagnetically securing said segments together.

16. A dynamoelectric machine having relatively rotatable armature and stator members; said stator member comprising a circular yoke portion, a polar projection extending radially inward from said yoke adapted to receive a field winding for said dynamoelectric machine, a second polar projection extending radially inward from said yoke and forming a consequent pole with said first named polar projection, and another polar projection extending radially inward from said yoke and positioned between said first and second named polar projections; a field coil positioned on said first named polar projection, said last named polar projection forming a consequent interpole with said first named polar projection whereby a portion of the flux provided by said field coil is diverted from said armature member into said last named polar projection substantially neutralizing the armature reaction in said armature at the point of commutation, said yoke portion of said first named and said second named polar projections being magnetically split along a diameter of said yoke extending substantially through the center of said first named and said second named polar projections forming two yoke segments, nonmagnetic material interposed between said segments, and means for nonmagnetically securing said segments together.

CHARLES A. THOMAS.

REFERENCES CITED

The following references are of record in the file of this patent:

UNITED STATES PATENTS

| Number | Name | Date |
|---|---|---|
| 666,315 | Johnson | Jan. 22, 1901 |
| 940,210 | Steinmetz | Nov. 16, 1909 |
| 1,255,607 | Hensley | Feb. 5, 1918 |
| 1,554,647 | Oswald | Sept. 22, 1925 |
| 1,851,591 | Parvin | Mar. 29, 1932 |

Certificate of Correction

Patent No. 2,465,824.   March 29, 1949.

CHARLES A. THOMAS

It is hereby certified that error appears in the printed specification of the above numbered patent requiring correction as follows:

Column 12, line 26, claim 16, for the words "portion of" read *portion and*; and that the said Letters Patent should be read with this correction therein that the same may conform to the record of the case in the Patent Office.

Signed and sealed this 8th day of November, A. D. 1949.

[SEAL]

THOMAS F. MURPHY,
*Assistant Commissioner of Patents.*